Patented Aug. 7, 1945

2,381,707

UNITED STATES PATENT OFFICE 2,381,707

REMOVAL OF ACETYLENE FROM HYDROCARBON MIXTURES

William Laurence Wood, Tunbridge Wells, and Bertram Ernest Victor Bowen, Tonbridge, England, assignors to The Distillers Company Limited, Edinburgh, Scotland, a British company No Drawing. Application June 7, 1943, Serial No. 489,992. In Great Britain May 19, 1942

4 Claims. (Cl. 260—677)

This invention relates to a method of removing acetylene from gas mixtures containing the same, and especially the removal of small amounts of acetylene from mixtures of normally gaseous hydrocarbons.

In the cracking of hydrocarbon oils, large quantities of gaseous paraffinic and olefinic hydrocarbons are obtained, together with a small quantity of acetylene, the actual proportions of which depends on the conditions of cracking. In working up these gases for use in the manufacture of various chemicals, they are usually separated into one or more fractions containing mainly compounds having three or more carbon atoms in the molecule and a fraction containing ethylene, methane, ethane and hydrogen together with any co-present acetylene.

The removal of this acetylene from the mixture, even when present in small traces of the order of 1% or even less, is desirable, especially when it is necessary to obtain a more concentrated ethylene fraction by absorption of the ethylene in cuprous solutions as the acetylene will also react to form the unstable copper acetylide, which separates out in the form of a slime or sludge.

According to the present invention, acetylene is removed from a gaseous mixture containing hydrocarbons, but substantially free from hydrocarbons containing four or more carbon atoms in the molecule, by passing the said gaseous mixture together with a small quantity of oxygen or an oxygen-containing gas over heated copper at temperatures between 200° and 350° C., the amount of available oxygen being equal to or in excess of, but not greatly in excess of, that required to burn all of the acetylene and any co-present hydrogen and/or carbon monoxide.

In this way the removal of acetylene can be effected continuously, as the copper remains substantially unoxidised over long periods of use. Under these conditions the acetylene burns in preference to any other hydrocarbon present. Any excess of oxygen over and above that required for complete oxidation of the acetylene, hydrogen and carbon monoxide initially present in the gas may, if desired, be removed by reaction with a small proportion of the ethylene or propylene present by heating in the presence of the above-mentioned copper catalyst at a temperature in excess of 350° C.; for certain purposes it is necessary to eliminate free oxygen from the gas.

The following examples illustrate the manner in which the invention may be carried into effect, the composition of the gas mixtures being given as percentages by volume.

*Example I.*—50 cu. ft./hr. of a gas containing 70% of ethylene, 20% of ethane, 9% of methane and 0.5% of acetylene were mixed with 5 cu. ft./hr. of air and passed, in heat exchange with the products leaving, into a reactor of which the internal temperature was maintained at 350° C. The volume of the reactor was 0.12 cu. ft. and it was packed with 10 lbs. of copper wire which had been oxidised at a temperature of 900° C.–1000° C. and subsequently reduced by coal gas at 600° C. The gas leaving the heat exchanger contained less than 1 part per million of either acetylene or oxygen, even after passing gas for 2500 hours.

*Example II.*—The oxidised copper wire which filled the reactor in the first example was removed and replaced by pellets composed of a mixture of 99 parts by weight of copper oxide powder, 1 pt. of iron oxide and 25 pts. of kaolin. The gas and air were passed at the same rates as in the preceding example and complete removal of acetylene and oxygen was achieved at a reactor temperature of 200° C. At 300° C. reactor temperature it was possible to pass the mixture of gas at 150 cu. ft./hr. whilst still obtaining complete removal of acetylene and oxygen.

*Example III.*—In this example the reactor was packed with 4 lbs. of copper turnings measuring $3/1000$ of an inch in thickness and having a width of $1/16$ of an inch. No initial oxidation of the copper was given. A gas mixture containing 3% of acetylene, 9% of oxygen and 88% of ethylene was passed at a rate of 150 cu. ft./hr. through the system, the reactor being maintained at 350° C. Removal of acetylene and oxygen was complete.

The optimum temperature for the process may vary according to the nature of the copper catalyst employed. For example, copper oxide which has been reduced by cracker gas at about 600° C. or by hydrogen at about 300° C. needs a temperature in excess of 250° C. preferably about 300° C. to carry out the reaction. If, however, a catalyst, obtained by pelleting a mixture of 99% by weight of copper oxide and 1% of iron oxide with a quarter of its weight of kaolin followed by reduction, is employed, the reaction may be carried out at 200° C. The temperature may also be controlled by regulation of the quantity of the excess of oxygen or oxygen-containing gas admitted to the reaction.

Space velocities in the neighbourhood of 1000-

3000 volumes of gas per volume of catalyst per hour are suitable for the process.

What we claim is:

1. A process for the removal, by selective oxidation, of acetylene from a gaseous mixture containing it in admixture with hydrocarbons of less than four carbon atoms in the molecule which comprises passing said gaseous mixture in admixture with an amount of available oxygen at least equal to, but not greatly in excess of, the amount required to burn all the acetylene and any co-present hydrogen and carbon monoxide, over a heated catalyst consisting essentially of metallic copper at a temperature between 200° C. and 350° C.

2. A process according to claim 1 wherein the copper catalyst is in the form of pellets or the like prepared by the reduction of copper oxide admixed with a small amount of iron oxide and kaolin.

3. A process according to claim 1 wherein a space velocity in the neighbourhood of 1000 to 3000 volumes of gas per volume of catalyst per hour is employed.

4. A process according to claim 1 wherein any excess available oxygen is removed from the treated gaseous mixture by reaction with the remaining hydrocarbon constituents thereof in the presence of a copper catalyst at a temperature in excess of 350° C.

WILLIAM LAURENCE WOOD.
BERTRAM E. V. BOWEN.